(12) United States Patent
Cook

(10) Patent No.: US 6,434,407 B1
(45) Date of Patent: Aug. 13, 2002

(54) SPEAKERPHONE FEATURE FOR A WIRELESS HANDSET

(75) Inventor: Steven Cook, Oceanside, CA (US)

(73) Assignee: Denso Corporation, Ltd., Aichi-Ken (JP)

( * ) Notice: Subject to any disclaimer, the term of this patent is extended or adjusted under 35 U.S.C. 154(b) by 0 days.

(21) Appl. No.: 09/453,643

(22) Filed: Dec. 3, 1999

(51) Int. Cl.[7] .............................. H04B 1/38; H04M 1/00
(52) U.S. Cl. ..................... 455/569; 455/90; 455/347; 455/575; 379/433.02; 379/420.02
(58) Field of Search ........................ 455/569, 90, 347, 455/575; 379/433.02, 433.06, 420.02, 430.03

(56) References Cited

U.S. PATENT DOCUMENTS

| | | | | |
|---|---|---|---|---|
| 5,909,490 A | * | 6/1999 | Sokolich et al. | 379/433.02 |
| 6,002,945 A | * | 12/1999 | McDuffee | 455/575 |
| 6,138,040 A | * | 10/2000 | Nicholls et al. | 455/569 |
| 6,301,491 B1 | * | 10/2001 | Gong | 455/569 |
| 6,321,080 B1 | * | 11/2001 | Diethorn | 455/569 |

* cited by examiner

*Primary Examiner*—William Trost
*Assistant Examiner*—Simon Nguyen
(74) *Attorney, Agent, or Firm*—Fish & Richardson P.C.

(57) ABSTRACT

A wireless speakerphone is designed to prevent damage to a user's ear when the phone is placed against the user's ear during speakerphone operation. The phone includes a second speaker, or second speaker, embedded behind its rear surface. The rear surface is shaped so that, when resting against a rigid surface such as a desktop or tabletop, the rear surface and the rigid surface together form a waveguide that directs sound waves from the second speaker into the surrounding room.

19 Claims, 3 Drawing Sheets

SPEAKERPHONE FEATURE FOR A WIRELESS HANDSET

TECHNOLOGICAL FIELD

This application relates to wireless handsets.

BACKGROUND

The speakerphone is a common tool for allowing more than one person to participate in a telephone conference on a single telephone. Speakerphones also allow a person to participate in telephone calls without holding a handset.

Wireless handsets, such as cellular and cordless telephones, have become more prevalent in everyday use. Manufacturers have sought ways to include speakerphone features in these handsets. The push for miniaturized handsets, however, has limited the manufacturer's ability to include the speakerphone feature in cordless and wireless handsets. Moreover, a speakerphone must operate at a relatively high volume level, since the sound is projected through a room and not directly into a user's ear. The earpiece in a cordless or wireless handset could cause hearing damage if the earpiece were to be placed against a user's ear while the speakerphone is active.

SUMMARY

In recognition of the above, the inventor has developed a handset that projects speakerphone signals through the backside of the handset. This ensures that high volume sound waves are not projected into a user's ear even if the handset's earpiece is placed against the user's ear during speakerphone operation. Moreover, the handset's back surface is designed to ensure that sound waves projected by the speakerphone are not muffled when the handset is placed backside-down on a rigid surface, such as a desktop or tabletop. The handset's back surface and the rigid surface together form a waveguide that projects the sound waves into the surrounding room.

In one aspect, the invention features a wireless speakerphone. The speakerphone includes a protective housing, receiving circuitry that receives RF signals and outputs sound signals, and an earpiece speaker that receives some of the sound signals from the receiving circuitry and projects corresponding sound waves through a surface of the housing, such as the phone's front surface. The speakerphone also includes a second speaker that receives some of the sound signals from the receiving circuitry and projects corresponding sound waves through another surface in the housing, such as the phone's rear surface. The surface through which the second speaker projects sound waves opposes the surface through which the earpiece speaker projects sound waves.

In some embodiments, the speakerphone includes a path selector that delivers each of the sound signals from the receiving circuitry either to the earpiece speaker or to the second speaker. A selection component, such as a button or switch, is embedded in the housing to allow a user to toggle between the earpiece speaker and the second speaker.

In some embodiments, a portion of the phone's rear surface inclines toward its front surface, and the second speaker is positioned against this inclined portion. In other embodiments, the rear surface is shaped to include a cavity, and the second speaker is positioned to project the sound waves through the cavity. In general, the rear surface is shaped so that, when resting against a rigid surface, the rear surface and the rigid surface together form a waveguide to direct sound waves projected by the second speaker away from the handset and into the surrounding room.

Other embodiments and advantages will become apparent from the following description and from the claims.

DESCRIPTION OF THE DRAWINGS

These and other aspects will now be described in detail with respect to the accompanying drawings, wherein.

DETAILED DESCRIPTION

Figure 1:
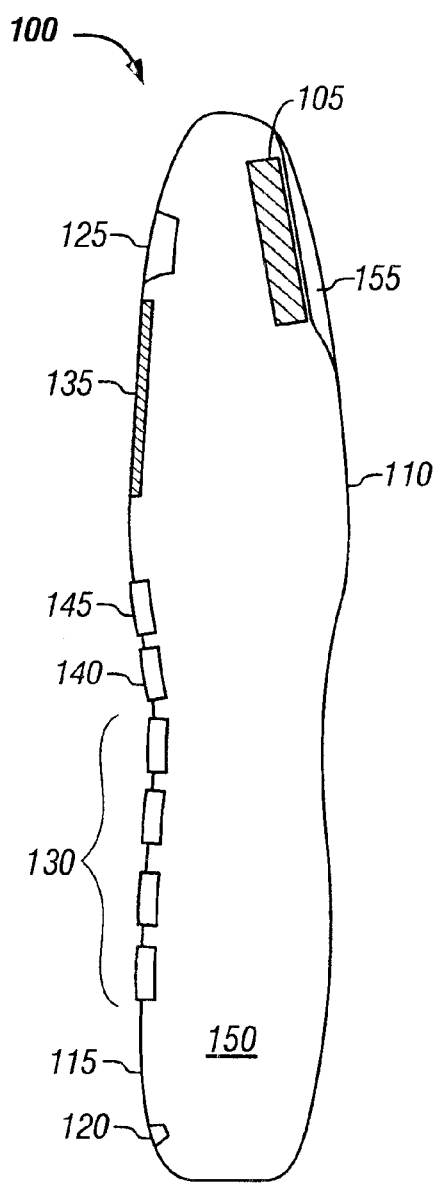
FIG. 1 shows a centerline cross-section of a wireless handset having a speaking on its backside.

FIG. 1 shows a cross-section of a wireless handset 100 that includes a speaker 105 mounted against the back surface 110 of the handset's protective housing 150. The speaker 105 allows the handset to operate as a speakerphone by projecting relatively high-volume sound waves through the back surface 110 and into a surrounding room.

In general, the lower portion of the handset's back surface extends roughly parallel to the front surface. The upper portion of the back surface 110 tapers, or inclines, toward the front surface 115. In some embodiments, the upper portion of the back surface 110 forms a cavity 155, or well, through which the speaker 105 projects the sound waves. The benefits provided by these features are described below.

As in a conventional wireless handset, this handset 100 includes certain components embedded in its front surface 115. These components allow a user to place and receive telephone calls. In some cases, it allows sending and receiving text messages. These components include a microphone 120, for use in picking up and transmitting sound waves from the user to a remote party; an earpiece 125, for use in projecting sound into the user's ear; a keypad 130, for use in dialing telephone numbers and entering text strings into the handset; and a display screen 135, such as a liquid crystal diode (LCD) display, for use in displaying text to the user. Some implementations also include a speakerphone select button 140, which allows the user to toggle between speakerphone and standard operation, and a volume-control button 145, which allows the user to adjust the volume of the speaker 105.

Figure 2:
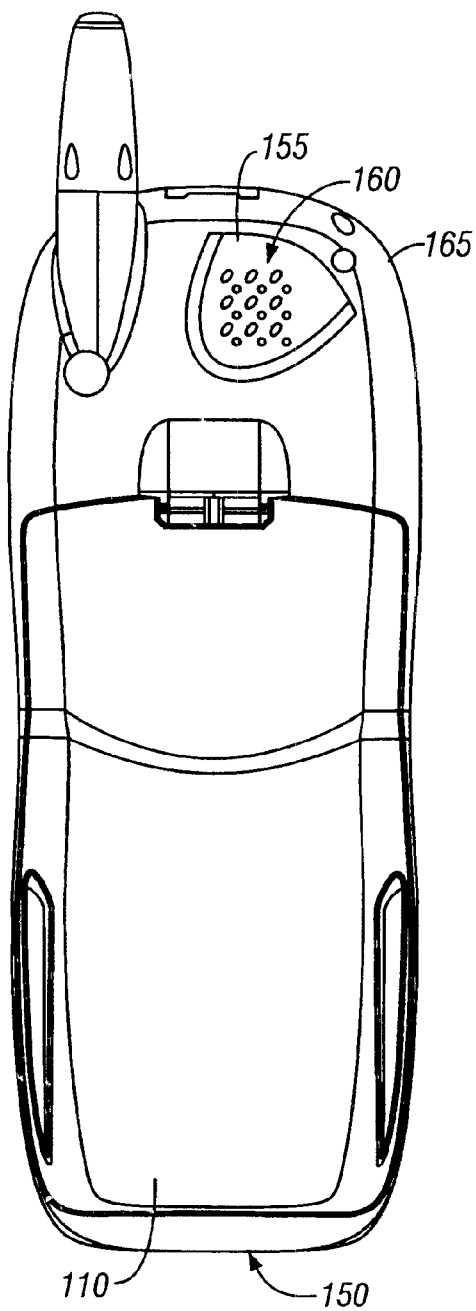
FIG. 2 shows a rear view of the handset.

FIG. 2 shows the back surface 110 of the handset 100. The speaker is mounted within the housing 150 behind an array of holes 160, or grill, formed in the cavity 155. In some embodiments, the speaker is placed near a corner 165 of the housing 150 so that sound waves emitted from the speaker can escape the housing 150 and enter the surrounding room quickly and with little attenuation. In the example shown here, the cavity 155 has a "rounded-V," or "boomerang," shape.

Figure 3:
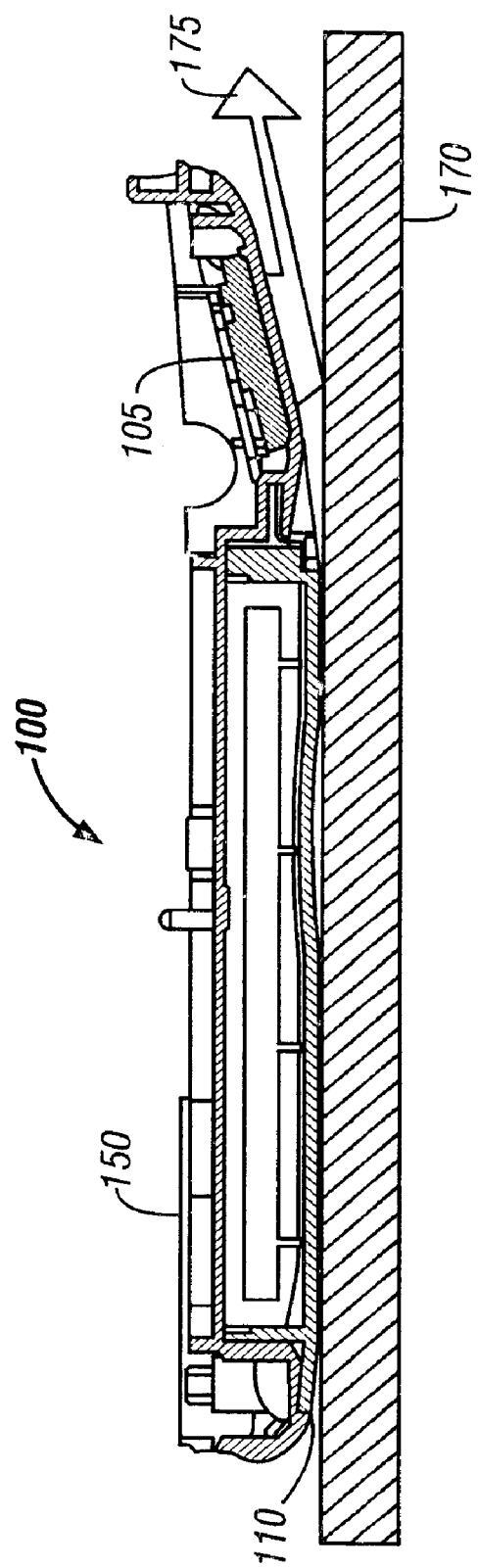
FIG. 3 shows a partial centerline cross-section of the handset resting on a rigid surface.

FIG. 3 shows the handset 100 with its back surface resting against a rigid surface 170, such as a desktop or a tabletop. The inclined portion of the back surface 110, against which the speaker 105 rests, ensures that the speaker 105 and the rigid surface 170 are separated by some distance. The inclined surface also ensures that the sound waves 175 emitted from the speaker 105 strike the rigid surface 170 at an angle. The handset's housing 150 and the rigid surface 170 together act as a waveguide that directs the sound waves 175 from the speaker 105 into the surrounding room. The cavity formed in the back surface 110 of the housing 150 enhances this effect by increasing the distance between the speaker 105 and the rigid surface 170. The wall of the cavity also enhances the wave-guiding effect of the housing 150. The position of the speaker 105 and the structure of the housing 150 together ensure that sound waves emitted from the speaker 105 are audible in the surrounding room even when the handset 100 is resting backside-down.

Figure 4:
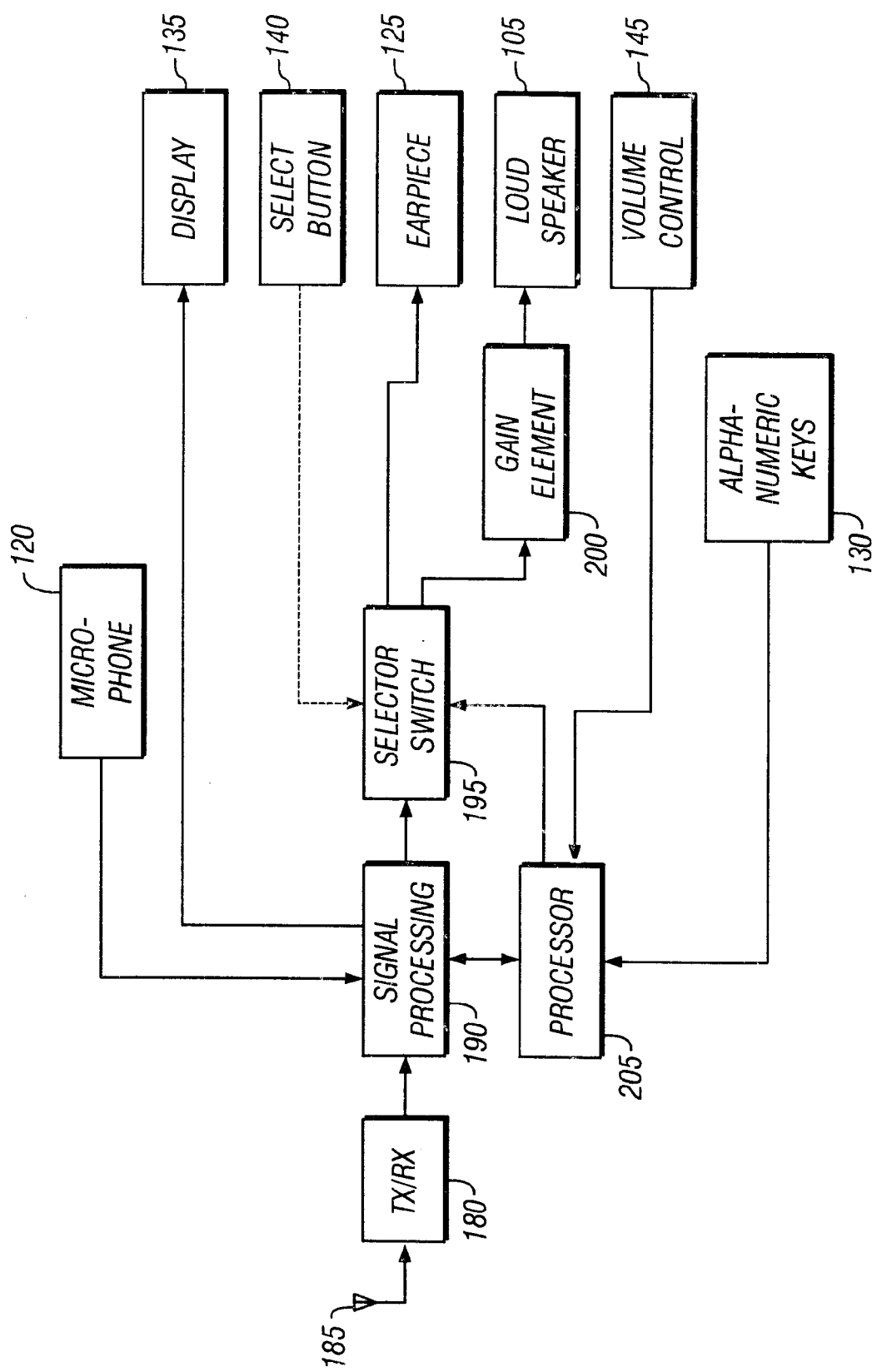
FIG. 4 shows a functional block diagram of the handset.

FIG. 4 shows the functional relationships among various components of the handset. The handset includes a radio frequency (RF) transceiver circuit 180 that sends and receives RF-modulated signals through an RF antenna 185. When acting as a receiver, the transceiver circuit 180 down-converts the incoming signal from its RF carrier frequency to baseband. A signal processing block 190 receives the baseband signal and recovers voice and/or data signals. Functions commonly performed by the signal processing block 190 include analog-to-digital conversion, automatic gain control, spectral filtering, voice encoding/decoding, and data modulation/demodulation. In a handset that uses a spread spectrum communication technique, such as code division multiple access (CDMA), the signal processing block 190 also despreads the incoming signal.

The signal processing block 190 delivers the recovered voice signals to a selector switch 195. The selector switch routes each voice signal either to the earpiece speaker 125 or to the loudspeaker 105. A controller or processor 205 generates a control signal that instructs the selector switch 195 as to which speaker to select. Alternatively, the selector switch 195 receives a control signal directly from the handset's speakerphone select button 140. The user presses this button to toggle between speakerphone and normal operation.

Because the loudspeaker 105 must project sound waves at relatively high volume levels, the voice signals delivered by the selector switch pass through a gain element 200 before entering the speaker 105. In some embodiments, the gain element 200 is an adjustable element that receives a control signal from the processor 205 or directly from the handset's volume control button 145. The volume control button 145 allows the user to adjust the gain of the gain element 200 directly.

In some handsets, the signal processing block 190 delivers digital data, such as text pages and caller identification messages, to the handset's display screen 135. The processor 205 receives signals from the handset's alphanumeric keypad 130 and converts these signals into corresponding DTMF signals or ASCII text characters. When the handset is transmitting, the signal processing block 190 receives voice signals from the microphone 125 and prepares the voice signals for RF transmission.

A number of embodiments of the invention are described above. A person of ordinary skill will recognize that various modifications are possible without departing from the spirit and scope of the invention. Accordingly, other embodiments are within the scope of the following claims.

What is claimed is:

1. A wireless handset comprising:
   a protective housing;
   receiving circuitry configured to receive RF signals and output sound signals;
   an earpiece speaker connected to receive some of the sound signals from the receiving circuitry and positioned to project corresponding sound waves through a first surface of the housing;
   a second speaker connected to receive others of the sound signals from the receiving circuitry and positioned to project corresponding sound waves through a second surface opposing the first surface, where the second speaker operates at a higher volume than the earpiece speaker; and
   wherein the second surface is shaped so that, when the second surface rests against a rigid surface, the sound waves projecting from the second speaker through the second surface strike the rigid surface at an acute angle.

2. The handset of claim 1, further comprising a path selector connected to deliver each of the sound signals from the receiving circuitry either to the earpiece speaker or to the second speaker.

3. The handset of claim 2, further comprising a selection component embedded in the housing to allow a user to toggle between the earpiece speaker and the second speaker.

4. The handset of claim 1, wherein at least a portion of the second surface inclines toward the first surface and the second speaker is positioned against the inclined portion of the second surface.

5. The handset of claim 1, wherein the second surface is shaped to include a cavity and the second speaker is positioned to project sound waves through the cavity.

6. The handset of claim 1, wherein the second surface is shaped so that, when the second surface rests against a rigid surface, the second surface and the rigid surface together form a waveguide to direct sound waves projected by the second speaker away from the handset.

7. The handset of claim 1, wherein the second surface includes one or more holes and the second speaker is positioned to project sound waves through the holes.

8. The handset of claim 1, wherein the earpiece and the second speaker are positioned to project sound waves in substantially opposite directions.

9. A wireless speakerphone comprising:
   a protective housing;
   transceiving circuitry configured to send and receive RF signals over a communication channel and convert incoming RF signals into sound signals;
   a microphone;
   an earpiece speaker connected to receive some of the sound signals from the transceiving circuitry and positioned to project corresponding sound waves through a first surface of the housing;
   a second speaker connected to receive others of the sound signals from the transceiving circuitry and positioned to project corresponding sound waves through a second surface opposing the first surface, where the second speaker operates at a higher volume than the earpiece speaker; and
   wherein the second surface is shaped so that, when the second surface rests against a rigid surface, the sound waves projecting from the second speaker through the second surface strike the rigid surface at an acute angle.

10. The speakerphone of claim 9, further comprising a path selector connected to deliver each of the sound signals from the transceiving circuitry either to the earpiece speaker or to the second speaker.

11. The speakerphone of claim 10, further comprising a selection component embedded in the housing to allow a user to toggle between the earpiece speaker and the second speaker.

12. The speakerphone of claim 9, wherein at least a portion of the second surface inclines toward the first surface and the second speaker is positioned against the inclined portion of the second surface.

13. The speakerphone of claim 9, wherein the second surface is shaped to include a cavity and the second speaker is positioned to project sound waves through the cavity.

14. The speakerphone of claim 9, wherein the second surface is shaped so that, when the second surface rests against a rigid surface, the second surface and the rigid surface together form a waveguide to direct sound waves projected by the loudspeaker away from the housing.

15. The speakerphone of claim 9, wherein the second surface includes one or more holes and the second speaker is positioned to project sound waves through the holes.

16. The speakerphone of claim 9, wherein the earpiece and the second speaker are positioned to project sound waves in substantially opposite directions.

17. A method comprising:

receiving RF signals;

recovering sound signals from the RF signals; delivering some of the sound signals to an earpiece speaker in a telephone handset;

delivering others of the sound signals to a second speaker in the telephone handset;

for the sound signals delivered to the earpiece speaker, projecting the sound signals through a first surface of the handset; and for the sound signals delivered to the second speaker, projecting the sound signals through a second surface opposing the first surface so that, when the second surface rests against a rigid surface, the sound waves projecting from the second speaker through the second surface strike the rigid surface at an acute angle.

18. The method of claim 17, wherein projecting sound signals through the first surface includes projecting the sound signals in a first direction, and projecting sound signals through the second surface includes projecting the sound signals in a second direction substantially opposite to the first direction.

19. The method of claim 18, wherein delivering the sound signals to the earpiece speaker and the second speaker includes selecting between the earpiece speaker and the second speaker based upon a control signal initiated by a user.

* * * * *